United States Patent [19]

Diamond

[11] 3,934,964

[45] Jan. 27, 1976

[54] GRAVITY-ACTUATED FLUID DISPLACEMENT POWER GENERATOR

[76] Inventor: David Diamond, 2773 Mill Ave., Brooklyn, N.Y. 11234

[22] Filed: Aug. 15, 1974

[21] Appl. No.: 497,533

[52] U.S. Cl. ........................ 415/7; 415/5; 417/330; 417/337; 60/495

[51] Int. Cl.² ........................................ B23B 39/00

[58] Field of Search ......... 415/5, 7; 416/7; 417/320, 417/337; 60/495, 496

[56] References Cited

UNITED STATES PATENTS

| | | | |
|---|---|---|---|
| 29,149 | 7/1860 | Durham | 60/496 |
| 1,708,807 | 4/1929 | Tatay | 415/7 |
| 2,135,110 | 11/1938 | Platt | 60/496 |
| 2,513,136 | 6/1950 | Borsos | 60/496 |
| 3,194,008 | 7/1965 | Baumgartner | 415/7 |
| 3,360,926 | 1/1968 | Parr | 415/7 |
| 3,466,866 | 9/1969 | Eschenfeld | 60/496 |
| 3,857,242 | 12/1974 | Gilmore | 60/495 |

*Primary Examiner*—C. J. Husar

[57] ABSTRACT

A plurality of piston-sealed cylinders are secured in oppositely disposed units in spaced relationship to each other about the circumference of a rotational member having substantially horizontal axes of rotation. The rotational member and all cylinders are submerged within a fluid medium. Cylinders on the vertically upwardly moving side of the rotational member have their pistons withdrawn from sealed ends of the cylinders to create a large air space, reducing the weight of each such cylinder to less than the weight of the quantity of the fluid medium which each such cylinder displaces thereby giving each such cylinder buoyancy in the fluid medium and the tendency to rise therein. Cylinders on the vertically downwardly moving side of the rotational member have their pistons inserted substantially into the cylinders close to the sealed ends, reducing the air space, increasing fluid space in and the weight of each cylinder to a total weight greater than the weight of the amount of fluid medium displaced, whereby each such cylinder tends to sink vertically downwardly. The unbalanced condition of the cylinders drives the rotational member.

6 Claims, 11 Drawing Figures

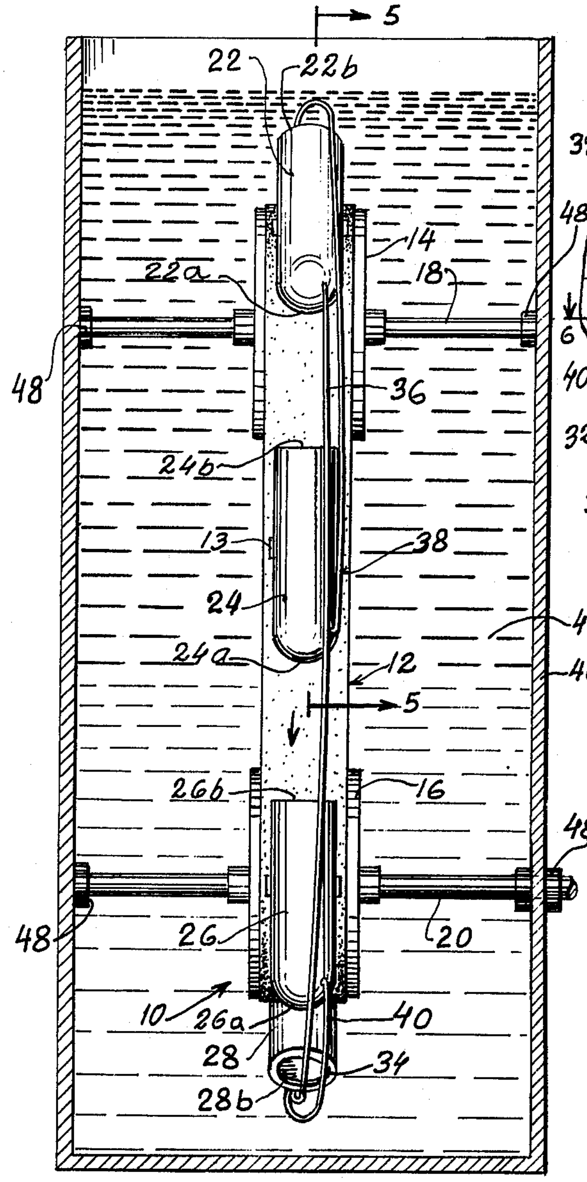
FIG. 4
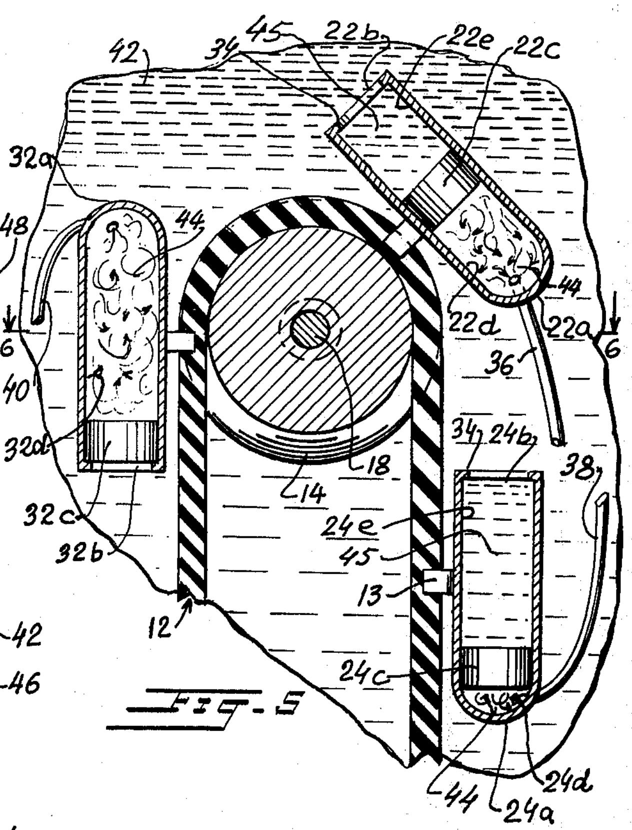
FIG. 5
FIG. 7
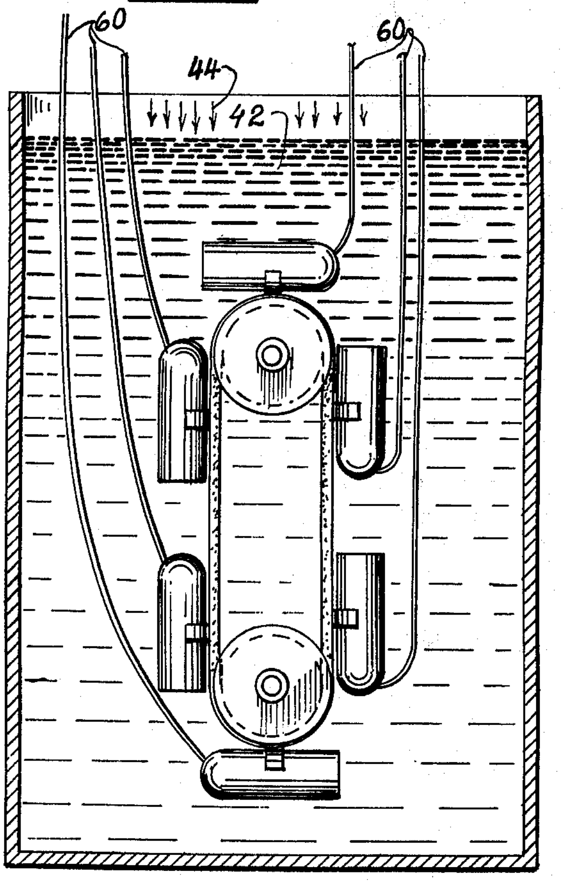
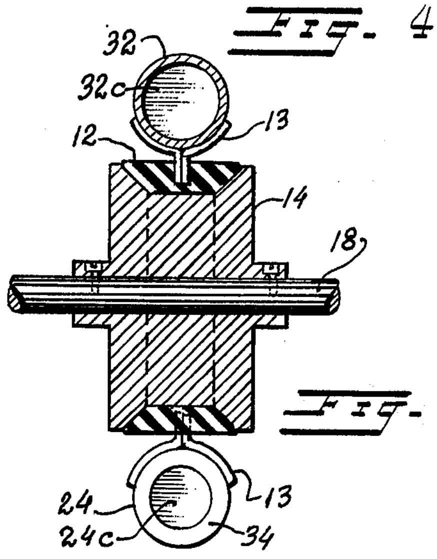
FIG. 6

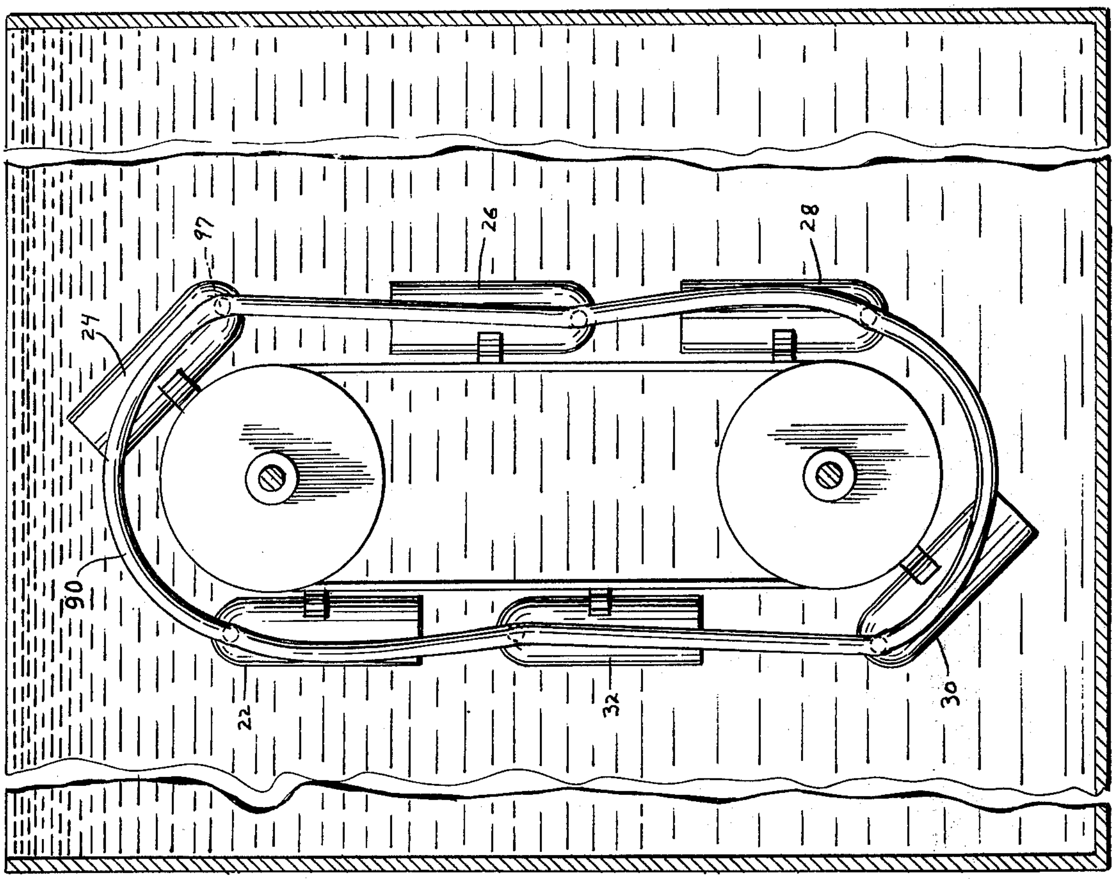
FIG. 11
FIG. 10
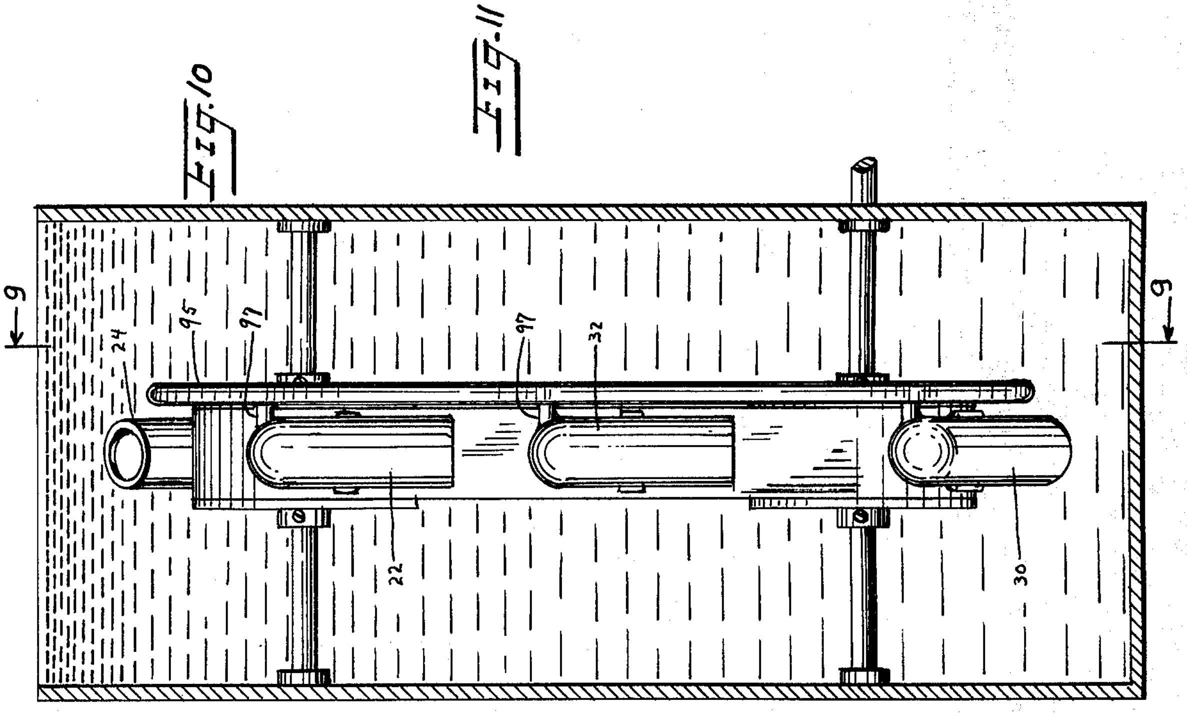

GRAVITY-ACTUATED FLUID DISPLACEMENT POWER GENERATOR

SUMMARY OF THE INVENTION

The invention makes use of the force of gravity and buoyancy of members immersed in a fluid medium. Archimede Principle is utilized by varying the weights of cylinders from less than the weight of displaced fluid to more than the weight of displaced fluid whereby the cylinders may selectively rise or fall within the fluid medium. By placing buoyant or rising cylinders on one side of a rotational member and sinking cylinders on the opposite side thereof, the member is rotationally driven about its axis or axes, which are substantially horizontal.

The change in weight is accomplished by a freely sliding piston actuated within a cylinder by gravity to change the weight of the cylinder by removing a heavier fluid and replacing it with a vacuum or a lighter fluid to reduce the weight of the cylinder below that of the displaced fluid medium. The cylinder so lightened accordingly is buoyant, tends to rise and when coupled to a member tends to raise that member. When the cylinder is inverted, which occurs on the opposite side of that member, the piston slides within the cylinder to reduce the volume in the cylinder occupied by the vacuum or light fluid, increase the volume in the cylinder occupied by a heavier fluid and reduce the amount of fluid medium displaced whereby the total weight of the cylinder is now greater than that of the displaced fluid medium and the cylinder sinks, carrying with it the portion of the member to which it is attached. If that member is free to turn, the action of vertically upward forces on one side and vertically downward forces on the opposite side would rotationally drive said member.

DESCRIPTION OF THE DRAWING

FIG. 4 is a side view of the structure shown in FIG. 3, additionally showing a fluid tank and bearing support for the shafts.

FIG. 5 is an enlarged fragmentary cross-sectional view taken across line 5—5 of FIG. 4. The various positions of the pistons within the cylinders are visible.

FIG. 6 is a cross-sectional view across line 6—6 of FIG. 5.

FIG. 7 is a fragmentary view of a modified embodiment of the invention wherein cylinders are not interconnected in opposite pairs but rather have their closed ends exposed out of the fluid medium.

FIG. 10 is a side view of a third modified embodiment of the invention showing cylinders having closed and open ends with the closed ends interconnected by a single continuous flexible tube.

FIG. 11 is a front view of the embodiment of the invention shown in FIG. 10.

DESCRIPTION OF THE PREFERRED EMBODIMENT

Figures 1, 2, 3:
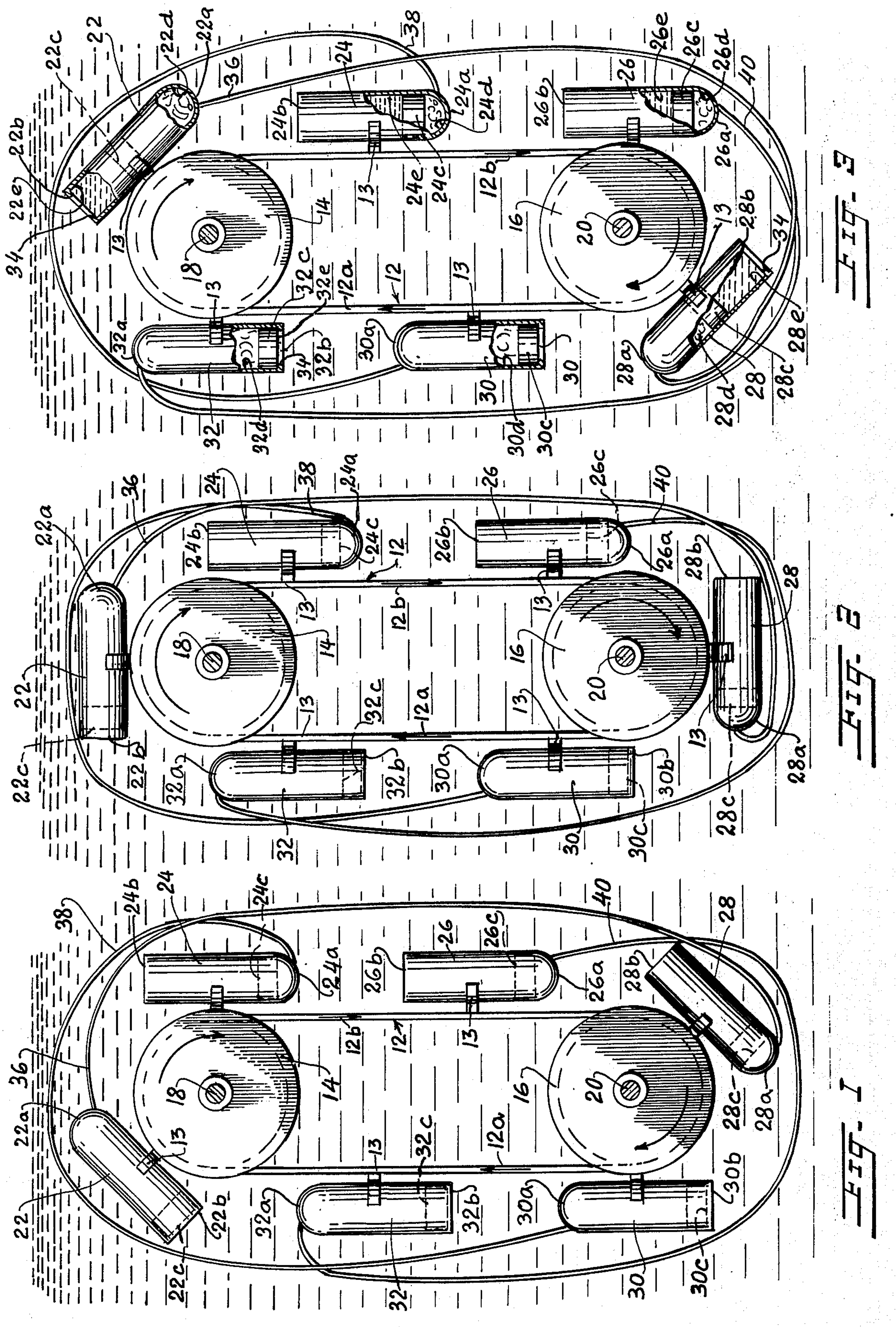
FIG. 1 is a front view of the gravity-actuated power generator of the present invention showing the preferred embodiment wherein each cylinder has one closed and one open end with the closed ends being interconnected in opposite pairs.
FIG. 2 is a view of the embodiment of the invention shown in FIG. 1 with the parts being rotationally displaced 45° clockwise from the position shown in FIG. 1.
FIG. 3 is a view of the embodiment of the invention shown in FIG. 1 with the parts being rotationally displaced 45° clockwise from the position shown in FIG. 2.

With reference to the drawing, the gravity-actuated power generator 10 of the present invention comprises a drive belt 12 drawn around an upper pulley 14 and a lower pulley 16, the pulleys having parallel horizontal axes of rotation on parallel shafts 18 and 20 disposed, respectively, vertically one above the other. Secured in spaced relation along drive belt 12 by means of clips 13 are an even-numbered plurality of cylinders 22, 24, 26, 28, 30 and 32. Each cylinder has an oppositely disposed cylinder separated by one-half the length of drive belt 12 to form oppositely disposed pairs of cylinders. Thus, cylinders 22 and 28 are paired, as are cylinders 24 and 30, and cylinders 26 and 32. Six cylinders, forming three pairs, are shown in the drawing, but any even number of cylinders may be utilized as befits the particular application to which power generator 10 is put.

Each cylinder has a sealed end and an open end, the sealed end being the leading end in the direction of motion of each cylinder. As shown in FIGS. 1–3 and 5, the direction of rotation of pulleys 14 and 16 and of drive belt 12 is closckwise. For ease of reference the sealed end of cylinder 22 is denominated **22*a* and the open end of cylinder 22 is denominated 22*b*; similarly cylinder 24 has a sealed end 24*a* and an open end 24*b*,** and so on for each of the cylinders.

Within each cylinder is a sliding piston. For ease of reference the piston in cylinder 22 is denominated **22*c*, the piston in cylinder 24 is denominated 24*c*, and so on for each of the cylinders. Each piston seals against the inner bore of its cylinder and there is accordingly provided in each cylinder between the piston and the sealed end thereof a closed chamber. Between each piston and the open end of its cylinder is formed an open chamber. Closed chambers are denominated 22*d*, 24*d*, etc., and open chambers are denominated 22*e*, 24*e* etc., for cylinders 22, 24, etc., respectively. Sealing action of each piston against the bore of its cylinder provides a fluid-proof division between the closed chamber and the open chamber thereof. The volumes in the chambers vary in accordance with the positions of the sliding pistons. Each open end of each cylinder is provided with a radially inwardly facing flange 34** which prevents each piston from sliding out of its cylinder.

Sealed ends of oppositely paired cylinders and the closed chambers are connected to each other by means of tubes or other suitable conduits. Thus, tube 36 interconnects sealed end **22*a* with sealed end 28*a*, thereby placing closed chamber 22*d* in fluid communication with closed chamber 29*d*. Similarly, tube 38 interconnects sealed end 24*a* with sealed end 30*a*, thereby placing closed chamber 24*d* in fluid communication with closed chamber 30*d*. Also, tube 40 interconnects sealed end 26*a* with sealed end 32*a*, thereby placing closed chamber 25*d* in fluid communication with closed chamber 32*d*.**

The interconnecting tubing provides three independent fluid systems, one closed fluid system for each of the opposite pairs of cylinders. It should here be pointed out that the term "fluid" as used throughout this specification and the claims includes both liquids, such as water, and gases, such as air.

The power generator 10 as described is totally immersed in a first fluid 42 defined as a fluid which is heavier than a second fluid 44 which completely fills each of the fluid systems. In the preferred embodiment, first fluid 42 is water and second fluid 44 is air. By way of illustration, FIG. 4 shows a water tank 46 with power generator 10 mounted therein by means of bearing 48 securing shafts 18 and 20 in the positions first above described. Shaft 20 as shown is extending from water tank 46 as an illustration of the manner in which rotational power may be transmitted from power generator 10. Clearly, any conventional means of transmitting rotation of either of shafts 18 or 20 may be utilized. The vertical distance between shafts 18 and 20 is such that each vertical run of drive belt 12 is long enough to accommodate at least two cylinders simultaneously.

In the positions shown in FIG. 1, it will be seen that the upwardly moving run of drive belt 12, denominated 12*a*, is on the left and the downwardly moving run of drive belt 12, denominated 12*b*, is on the right. Cylinders 30 and 32 are moving upwardly with belt run 12*a* and cylinders 24 and 26 are moving downwardly with belt run 12*b*. Thus, sealed ends 30*a* and 32*a* are pointing upwardly and sealed ends 24*a* and 26*a* are pointing downwardly. Cylinder 22 is rotating on upper pulley 14 but, in the position shown, has not yet reached the uppermost point of the top of pulley 14 and sealed end 22*a* is accordingly still pointing up from the horizontal. Conversely, opposite cylinder 28 rotating on lower pulley 16 has not yet reached the lowermost point of the bottom of pulley 16 and sealed end 28*a* is accordingly pointing downwardly below the horizontal.

The force of gravity acts, of course, at all times on all components of the system. Freely sliding pistons are accordingly pulled and held at the lowermost points within each cylinder. Thus, pistons 22*c*, 32*c* and 30*c* of upwardly pointing cylinders 22, 32 and 30, respectively, are located against flanges 34 at open ends 22*b*, 32*b* and 30*b* of the cylinders, respectively; conversely, pistons 24*c*, 26*c* and 28*c* are located adjacent sealed ends 24*a*, 26*a* and 28*a* of downwardly pointing cylinders 24, 26 and 28, respectively. The result is that closed chambers 22*d*, 32*d* and 30*d* are relatively large, comprising almost the entire volumes of their cylinders, while open chambers 22*e*, 32*e* and 30*e* are relatively small and substantially insignificant. Cylinders 22, 32 and 30 are accordingly filled almost entirely with second fluid 44, air, and are quite buoyant, in that the combined weight of each such cylinder, its piston and the enclosed second fluid 44, is less than the weight of displaced first fluid 42. The result is also that open chambers 24*e*, 26*e* and 28*e* are relatively large, comprising almost the entire internal volumes of their cylinders, while closed chambers 24*d*, 26 *d* and 28*d* are relatively small and substantially insignificant. Cylinders 24, 26 and 28 are accordingly filled almost entirely with first fluid 42 which enters through open ends 24*b*, 26*b* and 28*b*, respectively, and sink in that the combined weight of each such cylinder, its piston and the enclosed second fluid 44 is greater than the weight of displaced first fluid 42.

With cylinders 22, 32 and 30 tending to float upwardly, and opposite cylinders 24, 26 and 28 tending to sink downwardly, belt 12 is driven in one direction and drive belt 12, pulleys 14 and 16 and shafts 18 and 20 all rotate clockwise as shown in FIGS. 1–3. The rotational force is directly proportional to the weight differential between opposite cylinders multiplied by the radial distance of the cylinders from the axes of rotation.

The rotation which has commenced by virtue of the oppositely positioned floating and sinking cylinders as shown in FIG. 1, does not stop but is continuous as shown in FIGS. 2 and 3. In FIG. 2, cylinders 32 and 30 are still moving upwardly by virtue of their buoyancy and cylinders 24 and 26 are sinking downwardly. Cylinders 22 and 28, being at the apogee and perigee, respectively, of their travels, are horizontal and changing their vertical directions of travel. Fractionally past the FIG. 2 position, cylinder 22 is pointing downwardly and cylinder 28 is pointing upwardly. Coincidentally therewith pistons 22*c* and 28*c* begin their downward slides, piston 22*c* toward sealed end 22*a* and piston 28*c* toward open end 28*b*. Second fluid 44, being pumped out of closed chamber 22*d*, is concurrently being drawn into closed chamber 28*d* through tube 36. First fluid 42 is being drawn into open chamber 22*e* while an equal volume thereof is being expelled from open chamber 28*e*. The progress of pistons 22*c* and 28*c* in sliding downwardly by force of gravity may be seen in FIG. 3. As rotation continues past the FIG. 3 position, the condition shown in FIG. 1 is again attained, although all members have advanced in position, with cylinder 22 now heavier, and cylinder 28 now lighter, than the amount of first fluid 42 displaced by each. There are again three floating cylinders positioned oppositely of three sinking cylinders, and the rotation of drive belt 12, pulleys 14 and 16 and shafts 18 and 20 is seen to be continuous.

The gravity-actuated power generator 10 as described accordingly basically comprises a plurality of variable-buoyancy variable-displacement containers (the cylinders) which, by virtue of gravity-actuated pump elements (the freely-sliding pistons) constantly displaces ballast (first fluid 42) to the downwardly-moving side of a driven element (drive belt 12). The continuing displacement of ballast to one side of a rotatable system creates a constant unbalance which drives the system.

The weights of certain of the components (such as tubes 36, 38 and 40 all of which are filled with second fluid 44) have not been considered because, being substantially equally distributed on both upwardly and downwardly moving sides, they balance and cancel each other out.

A first modified embodiment is shown in FIG. 7. The closed chambers of the cylinders, rather than being interconnected in opposite pairs as in the preferred embodiment, are simply exposed to second fluid 44 for intake and exhaust thereof as the open chambers are exposed to first fluid 42. Since it is preferred that second fluid 44 be air, this is accomplished simply by the extension of breathing tubes 60 from the closed chambers to above the level of second fluid 42. Tubes 60 would be long enough to extend from the lowermost cylinder position to above the first fluid level, and would be supported by a framework, not shown, so that the open ends of tubes 60 do not fall into the first fluid. It should be noted that tubes 60 are not shown full length in FIG. 7 due to space limitations. Operation of the first modified embodiment is similar to operation to the preferred embodiment, with freely-sliding pistons expelling ballast from cylinders on the upwardly-moving side of the drive belt, and permitting the inflow of ballast on the downwardly-moving side of the drive belt. Thus, the cross-sectional view of FIG. 5 applies to the first modified embodiment as well as to the preferred embodiment, except that all tubes would be extending upwardly.

Figure 9:
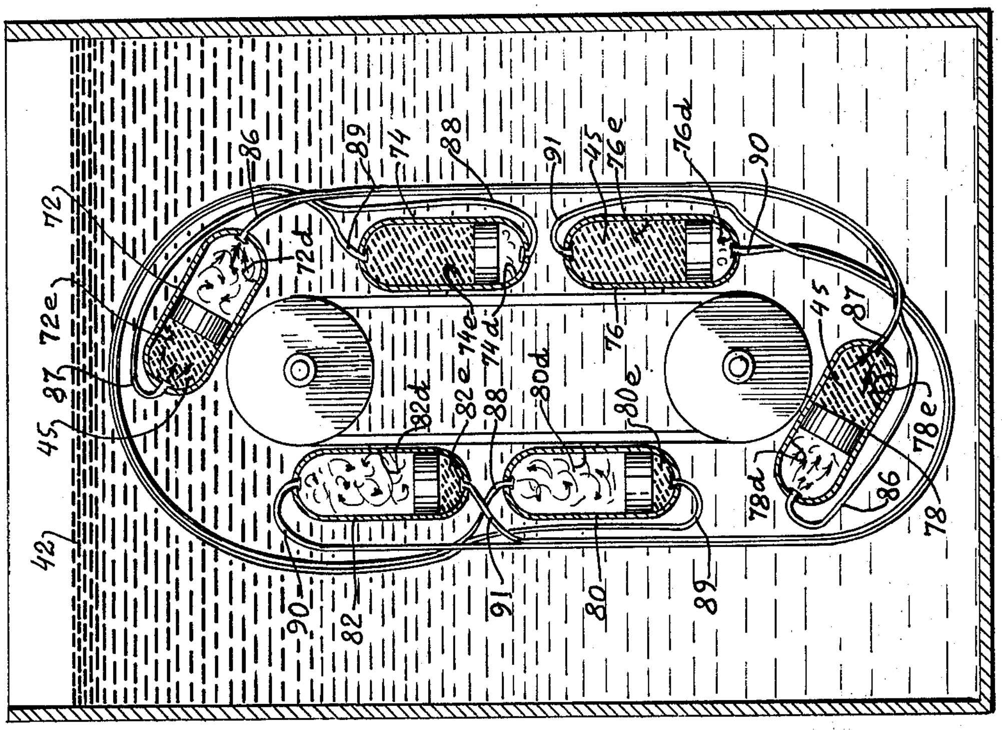
FIG. 9 is a view similar to that of FIG. 8 with the cylinders shown in cross-section.
Figure 8:
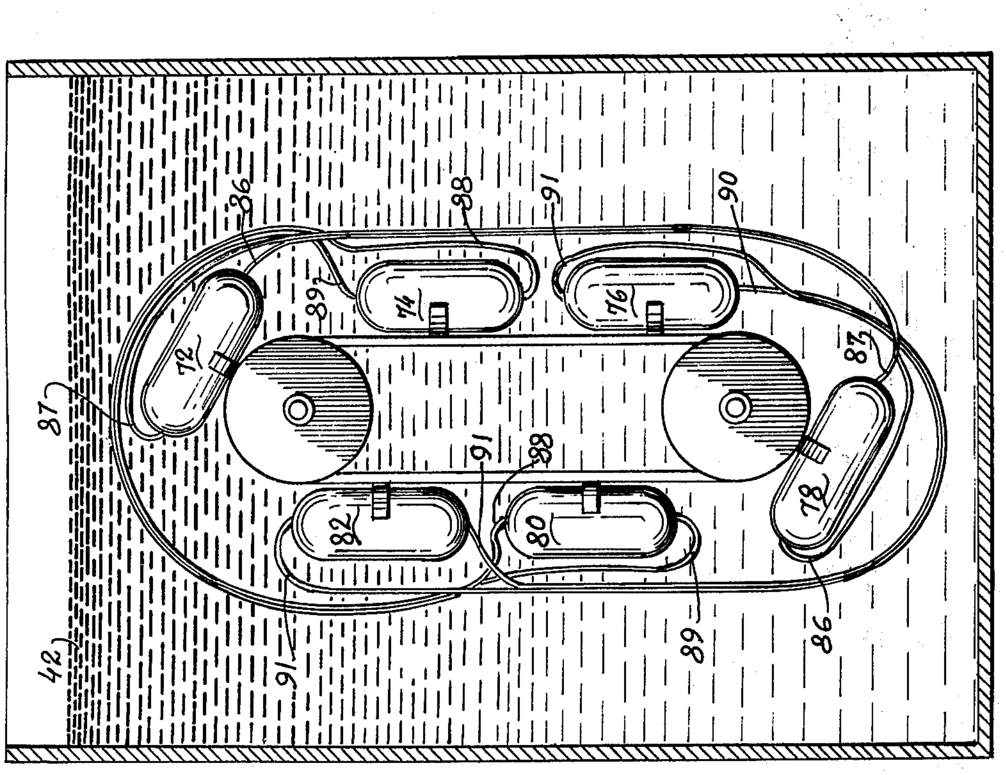
FIG. 8 is a front view of a second modified embodiment of the invention showing cylinders having two sealed ends, both interconnected in opposite pairs.

A second modified embodiment is shown in FIGS. 8 and 9. In this embodiment the open chambers of the preferred embodiment are themselves interconnected in opposite pairs. Thus, cylinders 72, 74 and 76 are interconnected with opposite cylinders 78, 82 and 80, respectively, such that closed chambers **72*d*, 74*d* and 76*d* are connected by tubes 86, 88 and 90, respectively, to opposite closed chambers 78*d*, 82*d* and 80*d*, also respectively, as in the preferred embodiment, and trailing chambers 72*e*, 74*e* and 76*e* are connected by tubes 87, 89 and 91, respectively, to trailing chambers 78*e*, 82*e* and 80*e***, also respectively.

The trailing chambers of the second modified embodiment are similar in function to the open chambers of the preferred embodiment except that being closed to the first fluid 42 in which the invention is immersed, there is no change in displacement as the cylinders change direction of rotation.

In addition to the three independent fluid systems formed between oppositely paired closed chambers by tubes 86, 88 and 90, there are three additional independent fluid systems formed between oppositely paired trailing chambers by tubes 87, 89 and 91. The closed chambers and interconnecting tubing contain, as in the preferred embodiment, a second fluid 44, such as air, which is lighter in weight than first fluid 42. The trailing chambers and interconnecting tubing contain a third fluid 45 which is heavier than first fluid 42. Third fluid 45 may be mercury. Thus, the freely-sliding pistons not only transfer second fluid 44 between oppositely paired closed chambers, but they also transfer, in reverse direction, third fluid 45 between oppositely paired trailing chambers. The result is that the weight of downwardly-moving cylinders is the total of cylinder, piston and relatively heavy third fluid 45 contained therein, creating a large weight differential between such cylinders and upwardly-moving cylinders which contain minimum quantities of third fluid 45. The large weight differential may be of importance in developing greater power from the generator of the present invention.

Another advantage of the second modified embodiment is the adaptability of both ends of the cylinders to greater streamlining, thereby reducing drag.

While the foregoing it illustrative of preferred and modified embodiments of the invention, it is clear that other embodiments may be had within the teachings hereof. For example, the second fluid in the preferred embodiment can be heavier than the first fluid, in which case the generator would rotate counterclockwise as seen in FIGS. 1-3. This would require modification of streamlining of each cylinder.

Another example of a modified embodiment is shown in FIGS. 10 and 11 of the drawing, in which a plurality of cylinders 22, 24, 26, 28, 30 and 32, similar to the cylinders of the primary embodiment, each having a closed end and an open end, are connected by a flexible tubular reservoir 95 which interconnects each of the closed chambers of the cylinders, by means of short connecting necks 97 such that there is free movement of second fluid 44 among the closed chambers. The advantage of this embodiment is that the separate tubes interconnecting opposite pairs of cylinders as shown in the primary embodiment are eliminated in favor of a functionally similar single tube which is in communication with all closed chambers.

A further modification would use two tubes, each similar to tube 95, in conjunction with the second modified embodiment shown in FIGS. 8 and 9 wherein there are two closed chambers for each cylinder and one interconnecting tube for each set of such closed chambers.

What is claimed is:

1. A gravity-actuated power generator, comprising:

a. a first fluid medium;

b. a plurality of containers, said containers being immersed in and having a variable buoyancy with respect to said first fluid medium;

c. rotating means, said rotating means being connected to and driven by said containers, and having at least one substantially horizontal axis of rotation; and d. gravity-actuated pump means, said gravity-actuated pump means being connected to and controlling the buoyancy of said containers in accordance with the positions of said containers with respect to said axis of rotation;

e. whereby said containers positioned to move upwardly about said axis of rotation are lighter in weight, and said containers positioned to move downwardly about said axis of rotation are heavier in weight, relative to the weight of said first fluid medium displaced thereby;

f. such that said containers move by force of gravity and fluid displacement about said axis of rotation, g. a second fluid medium, said second fluid medium being lighter than an equal volume of said first fluid medium and being contained within said containers; and h. conduit means, said conduit means connecting between said containers positioned to move upwardly about said axis of rotation and said containers positioned to move downwardly about said axis of rotation, thereby forming opposite pairs of containers, i. said gravity-actuated pump means being adapted to pump said second fluid medium from said containers positioned to move downwardly about said axis of rotation, through said conduit means to said containers positioned to move upwardly about said axis of rotation.

2. A gravity-actuated power generator in accordance with claim 1, wherein:

a. said gravity-actuated pump means comprises a freely-sliding piston with each said container, said piston dividing the interior of each said container into a variable-volume open chamber and a variable-volume closed chamber, b. the position of said freely-sliding piston within each said container determining the size of said open chamber and the size of said closed chamber, c. said open chambers being open to and filled with said first fluid medium, d. whereby the relative volumes of said first fluid medium and said second fluid medium in each said container, as determined by the position of said piston therein, determines the displacement of and buoyancy in said first fluid medium of each said container.

3. A gravity-actuated power generator in accordance with claim 1, wherein:

a. said gravity-actuated pump means comprises a freely-sliding piston within each said container, said piston dividing the interior of each said container into a variable-volume trailing chamber and a variable-volume closed chamber, b. the position of said freely-sliding piston within each said container determining the size of said trailing chamber and the size of said closed chamber, and c. additionally comprising a third fluid medium, said third fluid medium being heavier than an equal volume of said first fluid medium, said trailing chambers being filled with said third fluid medium, d. said closed chambers being filled with said second fluid medium, e. whereby the relative volumes of said second fluid medium and said third fluid medium in each said container, as determined by the position of said piston therein, determines the buoyancy thereof in said first fluid.

4. A gravity-actuated power generator, comprising:

a. a first fluid medium;

b. a plurality of containers, said containers being immersed in and having a variable buoyancy with respect to said first fluid medium;

c. rotating means, said rotating means being connected to and driven by said containers, and having at least one substantially horizontal axis of rotation; and d. gravity-actuated pump means, said gravity-actuated pump means being connected to and controlling the buoyancy of said containers in accordance with the positions of said containers with respect to said axis of rotation;

e. whereby said containers positioned to move upwardly about said axis of rotation are lighter in weight, and said containers positioned to move downwardly about said axis of rotation are heavier in weight, relative to the weight of said first fluid medium displaced thereby;

f. such that said containers move by force of gravity and fluid displacement about said axis of rotation, g. a second fluid medium, said second fluid medium being heavier than an equal volume of said first fluid medium and being contained within said containers; and h. conduit means, said conduit means connecting between said containers positioned to move upwardly about said axis of rotation and said containers positioned to move downwardly about said axis of rotation, thereby forming opposite pairs of containers, i. said gravity-actuated pump means being adapted to pump said second fluid medium from said containers positioned to move upwardly about said axis of rotation, through said conduit means, to said containers positioned to move downwardly about said axis of rotation.

5. A gravity-actuated power generator, comprising:

a. a first fluid medium;

b. a plurality of containers, said containers being immersed in and having a variable buoyancy with respect to said first fluid medium;

c. rotating means, said rotating means being connected to and driven by said containers, and having at least one substantially horizontal axis of rotation; and d. gravity-actuated pump means, said gravity-actuated pump means being connected to and controlling the buoyance of said containers in accordance with the positions of said containers with respect to said axis of rotation;

e. whereby said containers positioned to move upwardly about said axis of rotation are lighter in weight, and said containers positioned to move downwardly about said axis of rotation are heavier in weight, relative to the weight of said first fluid medium displaced thereby;

f. such that said containers move by force of gravity and fluid displacement about said axis of rotation, g. a second fluid medium, said second fluid medium being lighter than an equal volume of said first fluid medium and being contained within said containers; and h. conduit means, said conduit means extending from said containers to said second fluid medium, i. said gravity-actuated pump means being adapted to pump said second fluid medium from said containers positioned to move downwardly about said axis of rotation and to said containers positioned to move upwardly about said axis of rotation.

6. A gravity-actuated power generator, comprising:

a. a first fluid medium;

b. a plurality of containers, said containers being immersed in and having a variable buoyancy with respect to said first fluid medium;

c. rotating means, said rotating means being connected to and driven by said containers, and having at least one substantially horizontal axis of rotation; and d. gravity-actuated pump means, said gravity-actuated pump means being connected to and controlling the buoyancy of said containers in accordance with the positions of said containers with respect to said axis of rotation;

e. whereby said containers positioned to move upwardly about said axis of rotation are lighter in weight, and said containers positioned to move downwardly about said axis of rotation are heavier in weight, relative to the weight of said first fluid medium displaced thereby;

f. such that said containers move by force of gravity and fluid displacement about said axis of rotation, g. a second fluid medium, said second fluid medium being lighter than an equal volume of said first fluid medium and being contained within said containers; and h. reservoir means, said reservoir means being connected to each of said containers to provide fluid communication among the said containers for said second fluid medium;

i. said gravity-actuated pump means being adapted to pump said second fluid medium from said containers positioned to move downwardly about said axis of rotation, through said reservoir means, to said containers positioned to move upwardly about said axis of rotation.

* * * * *